Patented May 9, 1939

2,157,796

UNITED STATES PATENT OFFICE 1,157,796

INTERMEDIATES FOR WATER-INSOLUBLE AZO DYESTUFFS

Friedrich Muth, Leverkusen-I. G. Werk, Germany, assignor to General Aniline Works, Inc., New York, N. Y., a corporation of Delaware No Drawing. Original application September 25, 1933, Serial No. 690,950. Divided and this application December 17, 1935, Serial No. 54,943. In Germany October 5, 1932

4 Claims. (Cl. 260—329)

The present invention relates to intermediate products suitable for the manufacture of water-insoluble azodyestuffs, more particularly it relates to compounds of the probable general formula:

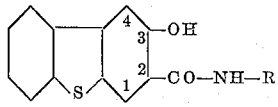

wherein R stands for an aromatic nucleus which may bear substituents which do not cause solubility in water, such as a benzene, naphthalene, anthracene or carbazole nucleus which may be substituted, for example, by alkyl, alkoxy halogen, the nitro group and the like.

My new compounds are prepared by starting with the 3-hydroxydiphenylenesulfide-2-carboxylic acid and condensing the same with the corresponding primary aromatic amines according to the known methods of preparing 2.3-hydroxynaphthoic acid arylamides. For example my new arylamides are obtainable by heating the carboxylic acid chloride or an ester of the carboxylic acid with the corresponding amine in an organic solvent, such as nitrobenzene, and with the addition of an acid-binding or water-binding agent respectively; favorably, the carboxylic acid-chloride is simultaneously prepared in the condensation process by starting with the free acid and dropping in phosphorus oxychloride or phosphorus trichloride.

The starting 3-hydroxydiphenylenesulfide-2-carboxylic acid used in the manufacture of the arylamides is obtainable, for example, by treating 3-hydroxy-diphenylene-sulfide in the presence of an alkali, or an alkali metal salt thereof, according to the Kolbe synthesis with carbon dioxide under superatmospheric pressure and at an elevated temperature.

The arylamides of the present application may be employed to produce water-insoluble azodyestuffs by diazotizing in the usual manner a primary amine suitable for preparing azodyestuffs free from a group inducing solubility in water and coupling in substance or on a substratum, especially the vegetable fibre, with the arylamides referred to above. The dyestuffs thus obtained generally yield brown to greenish to black shades, those prepared on the fibre according to the usual method of preparing ice colors being distinguished by good fastness properties.

The invention is illustrated by the following examples, without being limited thereto:

*Example 1.*—24.4 grams of 3-hydroxydiphenylenesulfide-2-carboxylic acid and 15.8 grams of 1-amino-2-methoxy-4-chlorobenzene are dissolved in 500 ccs. of toluene; at 60–65° C. 8 grams of phosphorus trichloride are slowly dropped in with stirring. After this, the solution is heated to boiling and kept boiling for about 8 hours while stirring. Then the solution is rendered alkaline by the addition of sodium carbonate, the toluene and excess amine are blown off with steam, and the remainder is filtered off and washed with water. It is then dissolved in a large quantity of water or alcohol with the addition of aqueous caustic soda lye, the solution having an intense yellow coloration and a powerful greenish fluorescence. The arylamide, which has the melting point 234° C. and corresponds to the following formula:

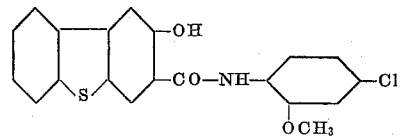

is precipitated by the addition of hydrochloric acid.

In an analogous manner the 3-hydroxydiphenylenesulfide-2-carboxylic acid yields with:

| | Degrees centigrade |
|---|---|
| Aniline, an arylamide of the melting point | 289 |
| 2-toluidine, an arylamide of the melting point | 207 |
| 4-toluidine, an arylamide of the melting point | 295 |
| 2-anisidine, an arylamide of the melting point | 195 |
| 4-anisidine, an arylamide of the melting point | 255 |
| 2-phenetidine, an arylamide of the melting point | 205 |
| 4-phenetidine, an arylamide of the melting point | 265 |

| | |
|---|---:|
| 4-chloroaniline, an arylamide of the melting point | 305 |
| 2-nitraniline, an arylamide of the melting point | 233 |
| 3-nitraniline, an arylamide of the melting point | 302 |
| 1-amino-2.5-dimethylbenzene, an arylamide of the melting point | 190 |
| 1-amino-2-methyl-4-methoxybenzene, an arylamide of the melting point | 244 |
| 1-amino-3-methyl-4-methoxybenzene, an arylamide of the melting point | 245 |
| 1-amino-2-methyl-4-chlorobenzene, an arylamide of the melting point | 268 |
| 1-amino-2-methyl-5-chlorobenzene, an arylamide of the melting point | 233 |
| 1-amino-2.4-dimethoxybenzene, an arylamide of the melting point | 260 |
| 1-amino-2.5-dimethoxybenzene, an arylamide of the melting point | 203 |
| 1-amino-2-methoxy-5-chlorobenzene, an arylamide of the melting point | 250 |
| 1-amino-3.4-dichlorobenzene, an arylamide of the melting point | 288 |
| 1-amino-2.4-dimethoxy-5-chlorobenzene, an arylamide of the melting point | 257 |
| 1-amino-2.5-dimethoxy-4-chlorobenzene, an arylamide of the melting point | 233 |
| 2-amino-6-ethoxybenzothiazole, an arylamide of the melting point | 270 |
| α-Naphthylamine, an arylamide of the melting point | 238 |
| 1-aminocarbazole, an arylamide of the melting point | 300 |

*Example 2.*—24.4 grams of 3-hydroxydiphenylenesulfide-2-carboxylic acid and 15 grams of dianisidine are suspended in ½ litre of toluene. At 60–70° C. 7 grams of phosphorus trichloride are dropped in, then the suspension is slowly heated to boiling and kept boiling, while well stirring, until the grey suspension has changed its coloration to yellow. Then the mixture is rendered alkaline to soda, the toluene is blown off with steam and the remainder is triturated with warm aqueous dilute hydrochloric acid, sucked off, and washed until free from acid. Thus is obtained a yellowish colored product of the melting point 336° C. It corresponds to the following formula:

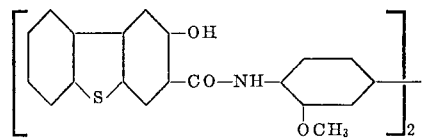

I claim:

1. Arylamides of the hydroxy diphenylenesulfide-carboxylic acid obtained by causing carbon dioxide to react upon 3-hydroxydiphenylenesulfide in the presence of an alkali, wherein the aryl is a member selected from the group consisting of monocyclic and dicyclic aromatic radicles, said arylamides being yellowish, water-insoluble substances suitable for producing azodyestuffs.

2. 2'.5'-dimethoxy-4'-chloroanilide of the hydroxydiphenylenesulfide carboxylic acid obtained by causing carbon dioxide to react upon 3-hydroxy diphenylenesulfide in the presence of an alkali, said anilide being a yellowish, water-insoluble substance of the melting point of 233° C. suitable for producing azodyestuffs.

3. 2'-methoxyanilide of the hydroxy diphenylenesulfide carboxylic acid obtained by causing carbon dioxide to react upon 3-hydroxydiphenylenesulfide in the presence of an alkali, said anilide being a yellowish water-insoluble substance of the melting point of 195° C. suitable for producing azodyestuffs.

4. 2-methyl-4-methoxyanilide of the hydroxydiphenylenesulfide-carboxylic acid obtained by causing carbon dioxide to react upon 3-hydroxydiphenylenesulfide in the presence of an alkali, said anilide being a yellowish water-insoluble substance of the melting point of 207° C. suitable for producing azodyestuffs.

FRIEDRICH MUTH.